United States Patent
Peng et al.

(10) Patent No.: US 9,520,946 B2
(45) Date of Patent: Dec. 13, 2016

(54) OPTICAL ENGINE

(75) Inventors: Zhen Peng, Foster City, CA (US); David A. Fattal, Mountain View, CA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 28 days.

(21) Appl. No.: 14/416,312

(22) PCT Filed: Jul. 26, 2012

(86) PCT No.: PCT/US2012/048356
§ 371 (c)(1),
(2), (4) Date: Jan. 22, 2015

(87) PCT Pub. No.: WO2014/018043
PCT Pub. Date: Jan. 30, 2014

(65) Prior Publication Data
US 2015/0270901 A1  Sep. 24, 2015

(51) Int. Cl.
*H04B 10/50* (2013.01)
*G02B 6/42* (2006.01)
(Continued)

(52) U.S. Cl.
CPC .......... *H04B 10/50* (2013.01); *G02B 6/42* (2013.01); *G02B 6/4206* (2013.01); *G02B 6/43* (2013.01);
(Continued)

(58) Field of Classification Search
CPC .............................................. H04B 10/2504
See application file for complete search history.

(56) References Cited

U.S. PATENT DOCUMENTS 6,115,521 A  9/2000  Tran et al.
6,144,480 A  11/2000  Li et al.
(Continued)

FOREIGN PATENT DOCUMENTS

CN  1735826 A  2/2006
CN  102047160 A  5/2011
(Continued)

OTHER PUBLICATIONS

Extended European Search Report received in EP Application No. 12881884.6, Mar. 10, 2016, 8 pages.
(Continued)

*Primary Examiner* — Shi K Li
(74) *Attorney, Agent, or Firm* — Tarolli, Sundheim, Covell & Tummino L.L.P.

(57) ABSTRACT

One example relates to an optical engine comprising a given layer of given material overlaying an optical waveguide of another material. The given layer of given material can comprise an aligning seat to receive an optical transmitter to provide the optical signal. The aligning seat can also align the optical transmitter such that the optical transmitter provides the optical signal in a direction that is substantially non-oblique relative to a longitudinal axis of the optical waveguide. The optical engine can also include an optical signal redirector to tilt the optical signal by a tilt angle. The optical waveguide can comprise a grating coupler to diffract the optical signal provided at the tilt angle into the optical waveguide.

15 Claims, 8 Drawing Sheets

(51) Int. Cl.
*G02B 6/43* (2006.01)
*H04B 10/25* (2013.01)
*G02B 6/124* (2006.01)

(52) U.S. Cl.
CPC ........... *H04B 10/2504* (2013.01); *G02B 6/124* (2013.01); *G02B 6/423* (2013.01); *G02B 6/4214* (2013.01); *G02B 6/4215* (2013.01); *G02B 6/4245* (2013.01)

(56) References Cited

U.S. PATENT DOCUMENTS

| | | | |
|---|---|---|---|
| 7,184,627 | B1 | 2/2007 | Gunn, III et al. |
| 7,623,558 | B2 | 11/2009 | Bloom |
| 2004/0017977 | A1 | 1/2004 | Lam et al. |
| 2005/0046011 | A1 | 3/2005 | Chen et al. |
| 2005/0169576 | A1 | 8/2005 | Calewell |
| 2006/0239612 | A1 | 10/2006 | De Dobbelaere et al. |
| 2008/0240654 | A1* | 10/2008 | Pearson ............... G02B 5/1861 385/37 |
| 2010/0329603 | A1 | 12/2010 | Kopp |
| 2011/0075970 | A1* | 3/2011 | Schrauwen ............ G02B 6/124 385/37 |
| 2011/0249938 | A1 | 10/2011 | Chen et al. |
| 2012/0038903 | A1* | 2/2012 | Weimer ................... G01C 3/08 356/4.07 |
| 2012/0195332 | A1* | 8/2012 | Yoffe ....................... H01S 5/142 372/20 |
| 2014/0362374 | A1* | 12/2014 | Santori ................. G01J 3/1895 356/301 |

FOREIGN PATENT DOCUMENTS

| | | |
|---|---|---|
| EP | 0908747 A1 | 4/1999 |
| WO | WO-2008109982 A1 | 9/2008 |
| WO | WO-2009141332 A1 | 11/2009 |

OTHER PUBLICATIONS

International Preliminary Report on Patentability received in PCT Application No. PCT/US2012/048356, Feb. 5, 2015, 7 pages.
PCT International Search Report & Written Opinion, Mar. 28, 2013, PCT Patent Application No. PCT/US2012/048356, 10 pages.
Roelkens, G. et al., III-V/silicon Photonics for On-chip and Intra-chip Optical Interconnects, (Research Paper), Journal Laser and Photonics Reviews, Jan. 14, 2010, pp. 1-29, vol. 9999, No. 9999.
Schrauwen, J. et al., Polymer Wedge for Perfectly Vertical Light Coupling to Silicon, (Research Paper), Proceedings of SPIE, Jan. 24-29, 2009, vol. 7218.
Zhao, Y. et al., On-chip Coherent Combining of Angled-grating Diode Lasers Toward Bar-scale Single-mode Lasers, (Research Paper), Mar. 12, 2012, pp. 6375-6384, vol. 20, No. 6.

\* cited by examiner

OPTICAL ENGINE

BACKGROUND

In optics the index of refraction (or refractive index), denoted as 'n' of an optical medium, is a number that describes how light, or any other radiation, propagates through that medium. The index of refraction is defined as the factor by which the wavelength and the velocity of the radiation are reduced with respect to their vacuum values: When light moves from one medium to another, the light changes direction (e.g., the light is refracted).

A diffraction grating is an optical component with a periodic structure, which splits and diffracts light into several beams travelling in different directions. The directions of these beams depend on the spacing of the grating and the wavelength of the light so that the grating acts as the dispersive element.

DETAILED DESCRIPTION

An optical engine can include an optical waveguide sandwiched between two layers of material that have an index of refraction less than that of the optical waveguide, such that light is propagated across the waveguide via total internal reflection (TIR). Moreover, the optical waveguide can include a grating coupler that can diffract an optical signal into the optical waveguide. The optical signal can be provided to the grating coupler at an angle of about 2° to about 20° relative to a longitudinal axis of the optical waveguide. Moreover, a top layer of the optical engine can include an aligning seat that can ensure that optical signals provided by the optical transmitter are propagated at a direction non-oblique (e.g., parallel or perpendicular) relative to a longitudinal axis of the optical waveguide. The optical engine can include an optical signal redirector that can tilt the optical signal provided from the optical transmitter to an angle of about 2° to about 20° such that the optical signal provided from the optical transmitter can be propagated through the optical waveguide. The optical engine can reduce and/or eliminate the need for adjustment to the optical transmitter upon insertion of the optical transmitter into the aligning seat.

Figure 1:
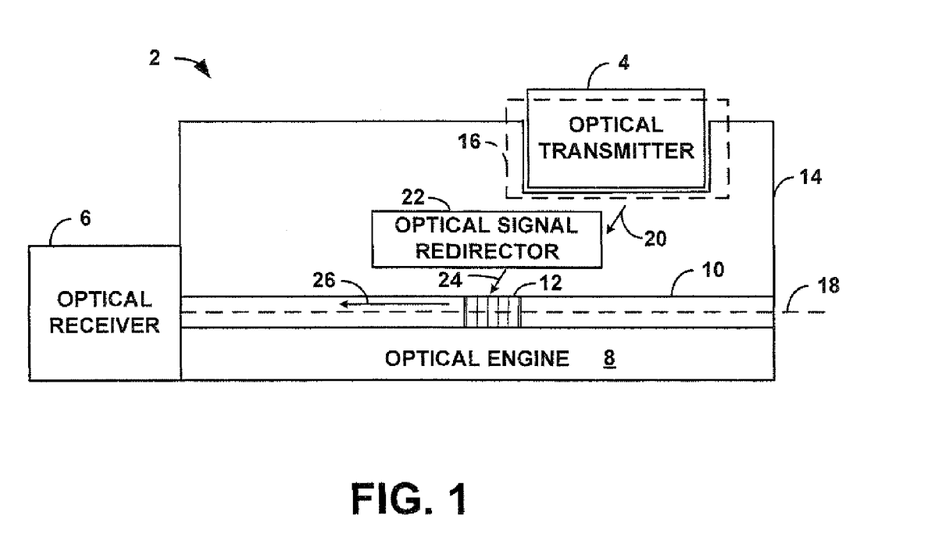
FIG. 1 illustrates an example of a system for transmitting and receiving an optical signal.

FIG. 1 illustrates an example of a system 2 for transmitting and receiving an optical signal. The optical signal can be provided from an optical transmitter 4. In some examples, the optical transmitter 4 can be implemented as a single mode laser array that can transmit K number of single mode optical signals, wherein K is a positive integer. In other examples, the optical transmitter 4 can be implemented as a multi-mode laser array that can transmit K number of multimode optical signals.

The optical signal can be received by an optical receiver 6, such as a photodetector. An optical engine 8 coupled between the optical transmitter 4 and the optical receiver 6 can guide the optical signal from the optical transmitter 4 to the optical receiver 6. In one example, the optical engine 8 can include layers formed from a given material with a given refractive index, such as a refractive index of about 1.46. The given material can be an optical medium. In one example, the given material could be implemented as silicon dioxide ($SiO_2$). The optical engine 8 can also include an optical waveguide 10 formed from a material with an index of refraction higher than the given refractive index, such as an index of refraction of about 2.05. The material forming the optical waveguide 10 can also be an optical medium. In some examples, the optical waveguide 10 can be formed from silicon nitride ($Si_3N_4$). In some examples, the optical waveguide 10 can be sandwiched in between the layers of the given material of the optical engine 8.

The optical waveguide 10 can include a grating coupler 12 for coupling an optical signal transmitted through the given material of the optical engine 8 into the optical waveguide 10. The grating coupler 12 can be implemented, for example, as a periodic array of grating elements (e.g., bars) formed from the same material as the optical waveguide 10. In some examples, the grating coupler 12 can be about 50 micrometers long, and each grating element can be about 10 micrometers wide. In other examples, the width of the optical waveguide 10 and/or the width of each grating element can be varied based on the wavelength of the optical signal transmitted from the optical transmitter 4.

A first layer 14 of the given material of the optical engine 8 can include an aligning seat 16 for the optical transmitter 4. The aligning seat 16 can be implemented, for example, as a trench (e.g., a cavity) that has a width that is only slightly larger (e.g., by about 3-4 micrometers) than the optical transmitter 4. In this manner, the optical transmitter 4 can be seated in the aligning seat 16 in a particular position relative to a position of the grating coupler 12. The optical transmitter 4 can transmit the optical signal into the layer 14 of the given material of the optical engine 8 at a non-oblique angle relative to a longitudinal axis 18 of the optical waveguide 10. For instance, in some examples, the optical signal can be transmitted from the optical transmitter 4 at an angle perpendicular to the longitudinal axis 18 of the optical waveguide 10. In other examples, the optical signal can be transmitted from the optical transmitter 4 at an angle parallel to the longitudinal axis 18 of the optical waveguide 10. The optical signal transmitted by the optical transmitter 4 can be represented as the arrow 20.

The optical signal can be received at an optical signal redirector 22 embedded in the layer 14 of the given material of the optical engine 8. The optical signal redirector 22 can be implemented, for example, as an optical wedge positioned to redirect light from the optical transmitter 4 to the optical waveguide 10. The optical wedge can be, for example, an air filled trench etched from the layer 14 of the given material of the optical engine 8. In some examples, the optical signal redirector 22 can be implemented as an optical wedge (e.g., a trench) etched on a surface of the aligning seat 16 of the optical engine 8. In such a situation, the optical signal redirector 22 can receive light transmitted substantially perpendicular to the longitudinal axis 18 of the optical waveguide 10 and tilt the optical signal toward the grating coupler 12 of the optical waveguide 10 to an angle of about 2° to about 20° (e.g., about 8°) relative to a line perpendicular to the longitudinal axis 18 of the optical waveguide 10. The optical signal tilted by the optical signal redirector 22 can be represented as the arrow 24.

In other examples, the optical signal redirector 22 can be implemented as an optical wedge (e.g., a trench) etched from the layer 14 of the given material of the optical engine 8. In such a situation, the optical wedge can be spaced apart from the aligning seat 16. In this example, the optical signal redirector 22 can receive the optical signal transmitted from the optical transmitter 4 at an angle substantially parallel to the longitudinal axis of the optical waveguide 10 and tilt the optical signal toward the grating coupler 12 of the optical waveguide 10 to an angle of about 2° to about 20° (e.g., about 8°) relative to an angle perpendicular to the longitudinal axis 18 of the optical waveguide 10.

The grating coupler 12 can diffract the optical signal tilted by the optical signal redirector 22 for transmission through the optical waveguide 10. Since the optical waveguide 10 has an index of refraction greater than the index of refraction of the given material of the optical engine 8, the optical signal is propagated along the optical waveguide 10 toward the optical receiver 6 by the employment of total internal reflection (TIR). The optical signal propagating through the optical waveguide 10 is represented by the arrow 26.

By employment of the system 2, an off-the-shelf optical transmitter can be dropped into the optical engine 8 and automatically aligned. Moreover, the optical transmitter 4 can transmit the optical signal to the optical receiver 6 without the need for fine tuning of an angle of transmission of the optical signal.

Figure 2:
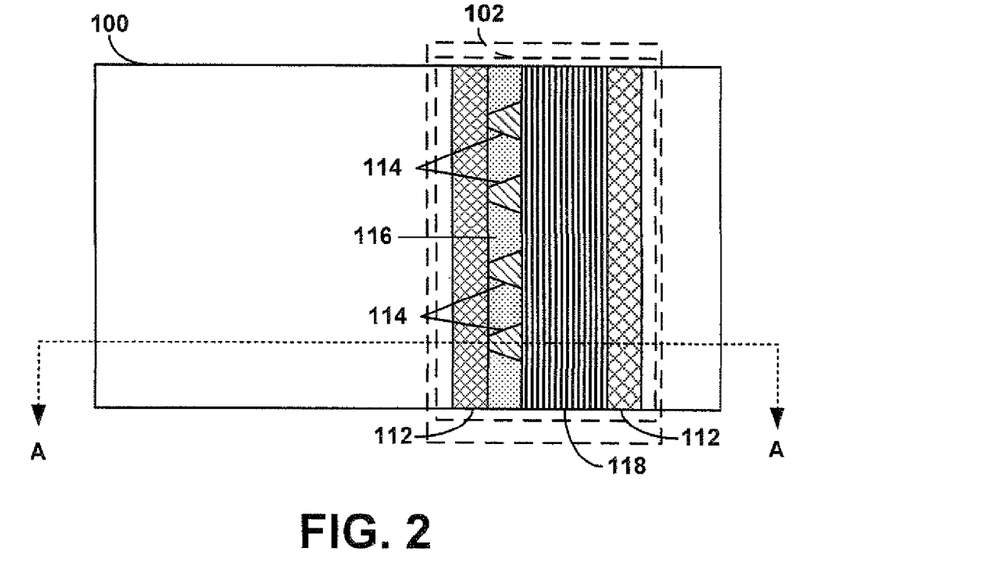
FIG. 2 illustrates a top view of an optical engine and an optical transmitter.
Figure 3:
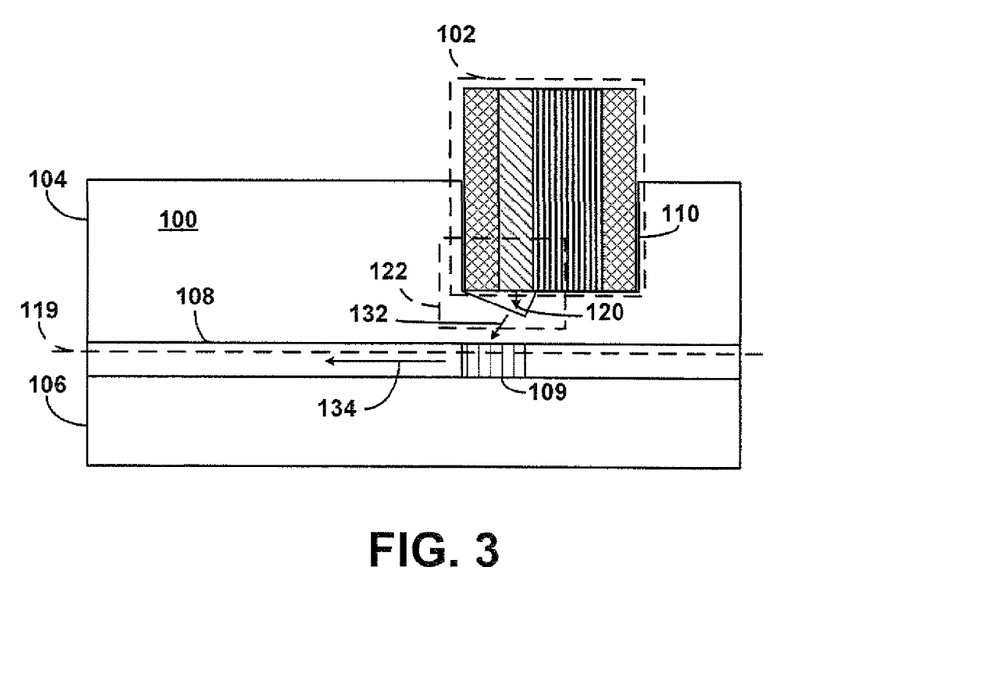
FIG. 3 illustrates a cross sectional view of the optical engine and the optical transmitter illustrated in FIG. 2.
Figure 4:
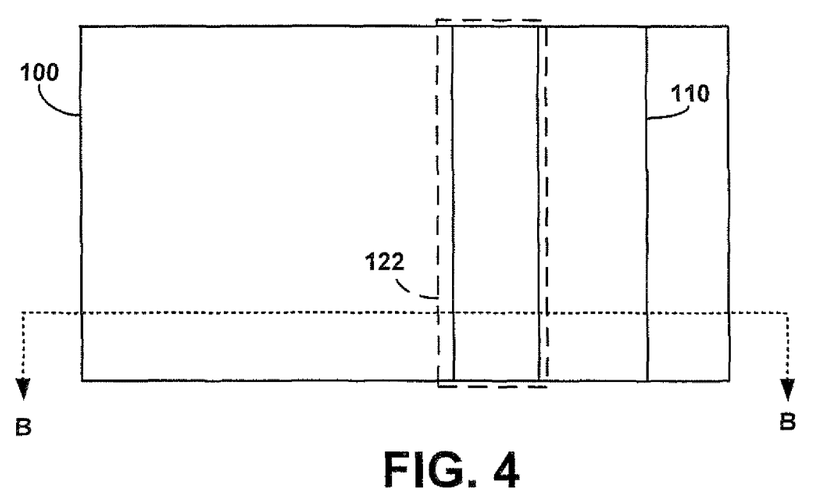
FIG. 4 illustrates an example of the optical engine illustrated in FIG. 2.
Figure 5:
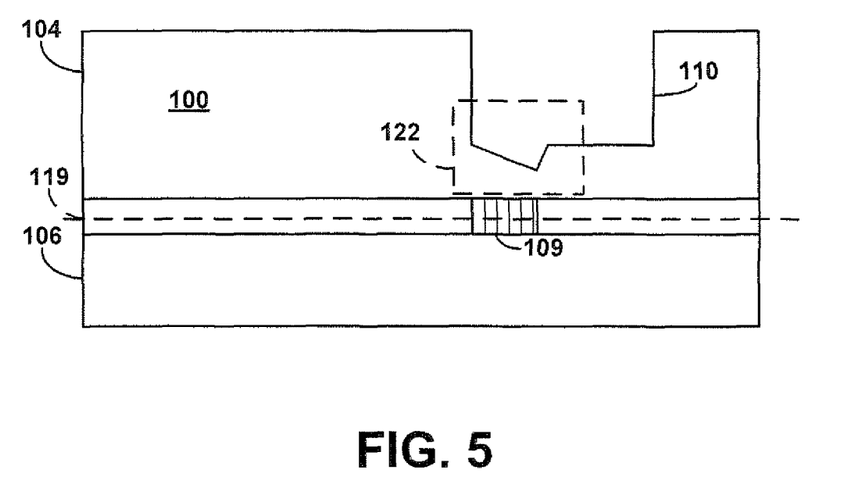
FIG. 5 illustrates an example of a cross sectional view of the optical engine illustrated in FIG. 4.

FIG. 2 illustrates a top view of an optical engine 100 and an optical transmitter 102 that could be employed, for example, as the optical engine 8 and the optical transmitter 4 illustrated in FIG. 1. FIG. 3 illustrates a cross sectional view of the optical engine 100 and the optical transmitter 102 taken along line A-A. FIG. 4 illustrates a top view of the optical engine 100 without the optical transmitter 102. FIG. 5 illustrates a cross sectional view of the optical transmitter 102 taken along line B-B. For purposes of simplification of explanation, the same reference numbers are employed in FIGS. 2-5 to reference the same structure.

The optical engine 100 can be implemented as a layered optical engine. A first layer 104 of the optical engine 100 can be implemented, for example, with a given material with a given index of refraction, such as an index of refraction of about 1.46. The given material could be implemented as an optical medium. In some examples, the given material could be implemented as silicon dioxide ($SiO_2$). The optical engine 100 can also include a second layer 106 of the given material. Moreover, the optical engine 100 can include an optical waveguide 108 sandwiched between the first and second layers 104 and 106 of the given material. The optical waveguide 108 can be implemented, for example, as an optical waveguide formed of a material with an index of refraction greater than the index of refraction of the given material, such as an index of refraction of about 2.05. In one example, the optical waveguide 108 can be formed from silicon nitride ($Si_3N_4$). The optical waveguide 108 can include a grating coupler 109 that can be implemented, for example, in a manner similar to the grating coupler 12 illustrated in FIG. 1.

The first layer 104 of the optical engine 100 can include an aligning seat 110 to receive the optical transmitter 102. The aligning seat 110 can be formed as a trench in the first layer 104 of the optical engine 100. The aligning seat 110 can position the optical transmitter 102 relative to the optical waveguide 108. The optical transmitter 102 can be implemented, for example, as an array of laser diodes, such as an array of K number of vertical-cavity surface-emitting lasers (VCSELs). The optical transmitter 102 can include metal contacts 112 that can be controlled, for example, by external circuitry. The optical transmitter 102 can also include K number of light guides 114 for transmitting optical signals. Each of the K number of light guides 114 can be define by implant or by an optical gain of a respective light guide 114. Each of the light guides 114 can be embedded in a light generating material, collectively illustrated as 116. The optical transmitter 102 can also include an n-type substrate 118.

Each of the K number of light guides 114 of the optical transmitter 102 can be independently controlled. Moreover, each of the K number of light guides 114 can transmit an optical signal in a direction substantially perpendicular to a longitudinal axis 119 of the optical waveguide 108, wherein an optical signal transmitted from the optical transmitter 102 is represented as an arrow 120.

The optical engine 100 can include an optical wedge 122 that can be etched from the aligning seat 110 of the optical engine 100. The optical wedge 122 can be employed, for example, to implement the optical signal redirector 22 illustrated in FIG. 1. In some examples, the optical wedge 122 can be an air filled trench. The optical wedge 122 can tilt the optical signal by a tilt angle, θ and such that the optical signal is tilted toward the grating coupler 109 of the optical engine 100.

Figure 6:
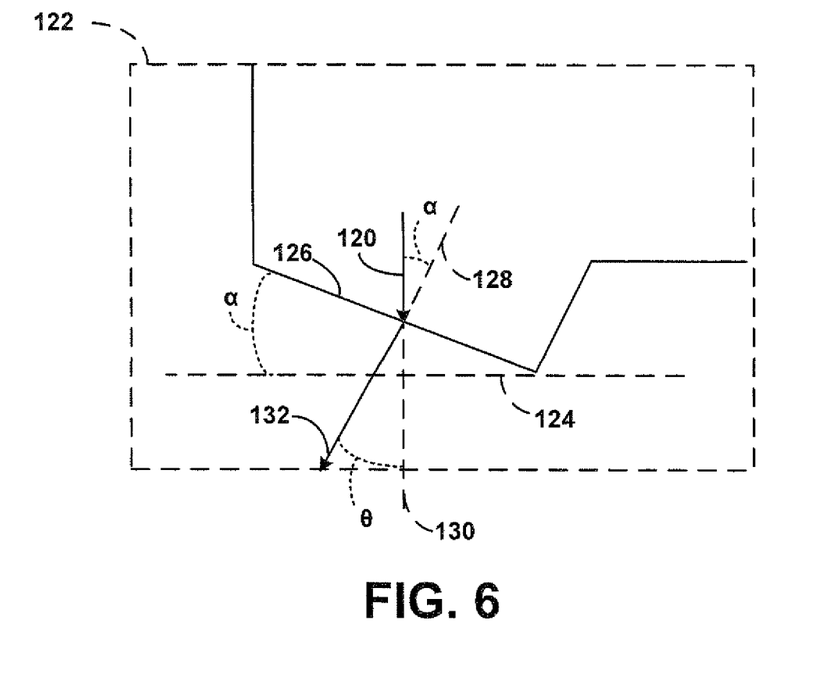
FIG. 6 illustrates an expanded view of an optical wedge.

FIG. 6 illustrates an expanded view of the optical wedge 122 illustrated in FIGS. 3 and 5. For purposes of simplification of explanation, the same reference numbers are employed in FIGS. 2-6 to designate the same structure.

A dashed line 124 is illustrated in FIG. 6 to denote a line parallel to the longitudinal axis 119 of the optical waveguide 108. Arrow 120 denotes an optical signal provided from the optical transmitter 102. The optical wedge 122 can have an incline angle that can be designated as an incline angle, denoted as α. Equations 1 and 2 can be employed to calculate the incline angle α.

$$n_2\sin(\alpha - \theta) = n_1\sin(\alpha) \qquad \text{Equation 1}$$

$$\theta = \alpha - \sin^{-1}\left(\frac{n_1}{n_2\sin}(\alpha)\right) \qquad \text{Equation 2}$$

wherein:

α is the incline angle, defined as the angle between a surface 126 of the optical wedge 122 and a line parallel 124 to the longitudinal axis 119 of the optical waveguide 108, as well as an angle between a line 128 normal to the surface 126 and the optical signal 120 provided by the optical transmitter 102;

θ is the tilt angle, which can be defined as the angle between the a line 130 normal to the line 124 parallel to the longitudinal axis 119 of the optical waveguide 108 and the optical signal tilted by the optical wedge 122, which optical signal can be represented as arrow 132, and $$\theta < 90° - \sin\left(\frac{n_1}{n_2}\right);$$

$n_1$ is the index of refraction of the material in the optical wedge 122 (e.g., air); and $n_2$ is the index of refraction of the material in the first layer 104 of the optical engine 100 (e.g., silicon dioxide, $SiO_2$).

In one example, the material in the optical wedge 122 can be air, such that n1 can be equal to about 1.0, and the material in the first layer 104 of the optical engine 100 can be silicon dioxide ($SiO_2$), such that $n_2$ can be equal to about 1.46. In some examples, $\theta$ can be an angle from about 2° to about 20° (e.g., about 8°). Accordingly, the incline angle $\alpha$ can be readily determined.

Referring back to FIGS. 2-5, the optical signal can be tilted to a tilt angle by the optical wedge 122 and provided to the grating coupler 109 at the tilt angle (e.g., about 8°) as indicated by the arrow 132. The grating coupler 109 can diffract the optical signal for transmission into the optical waveguide 108 such that the optical signal can be propagated through the optical waveguide 108 in the direction indicated by the arrow 134. By employment of the optical engine 100 and the optical transmitter 102, the optical transmitter 102 is automatically seated and aligned in the optical engine 100 upon insertion of the optical transmitter 102 into the optical engine 100. Moreover, the aligning seat 110 and the optical wedge 122 of the optical engine 100 can reduce and/or obviate the need for adjustment of an angle of transmission of the optical transmitter 102.

Figure 7:
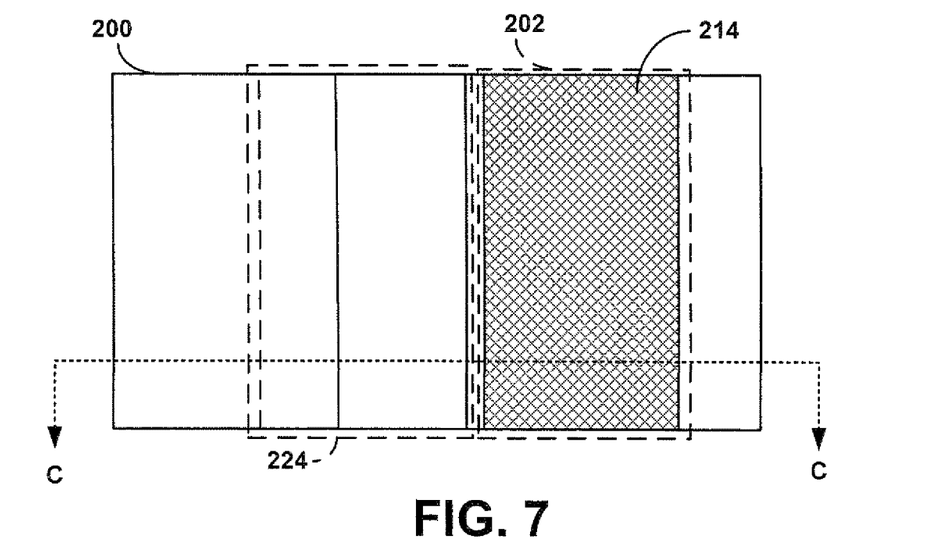
FIG. 7 illustrates a top view of another optical engine and another optical transmitter.
Figure 8:
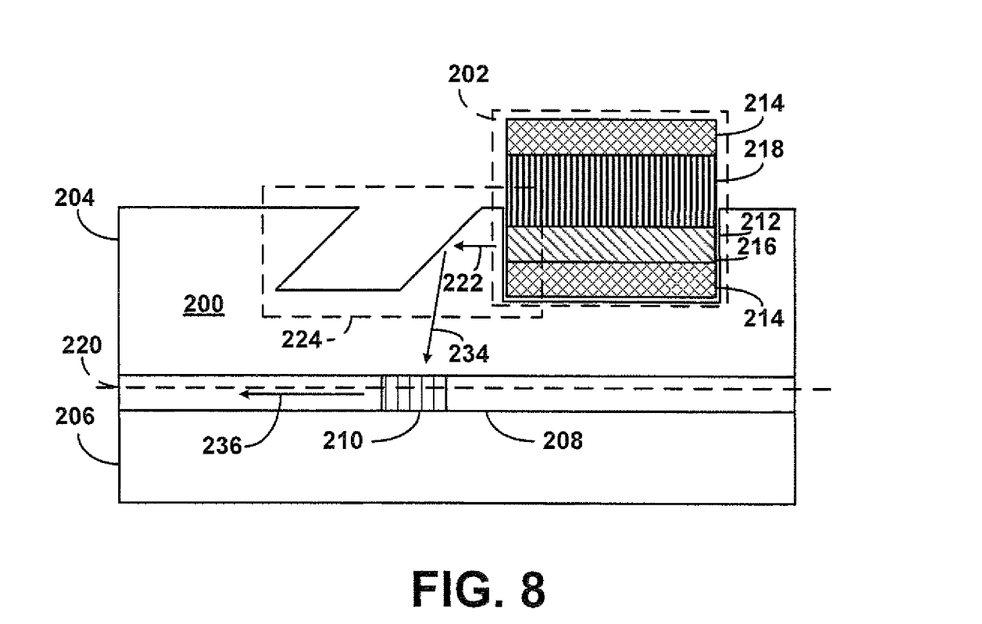
FIG. 8 illustrates a cross sectional view of the optical engine and the optical transmitter illustrated in FIG. 7.
Figure 9:
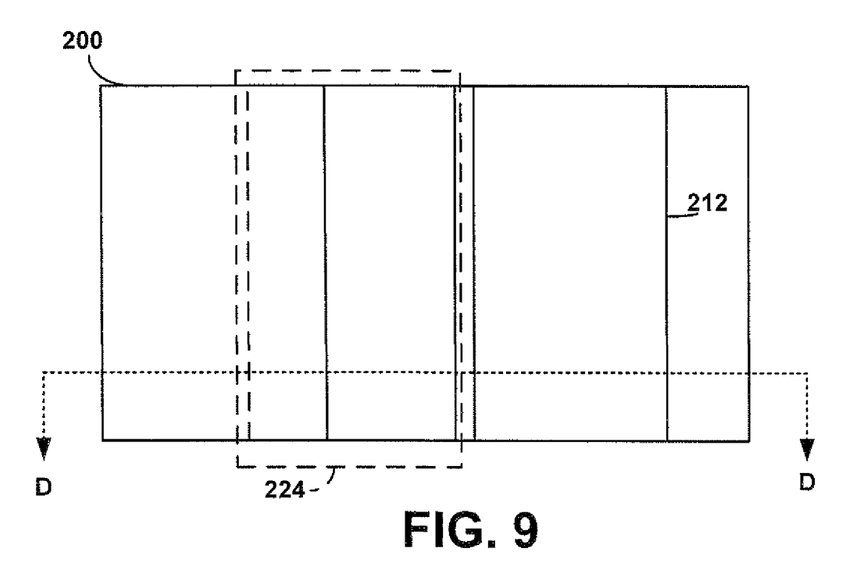
FIG. 9 illustrates an example of the optical engine illustrated in FIG. 7.
Figure 10:
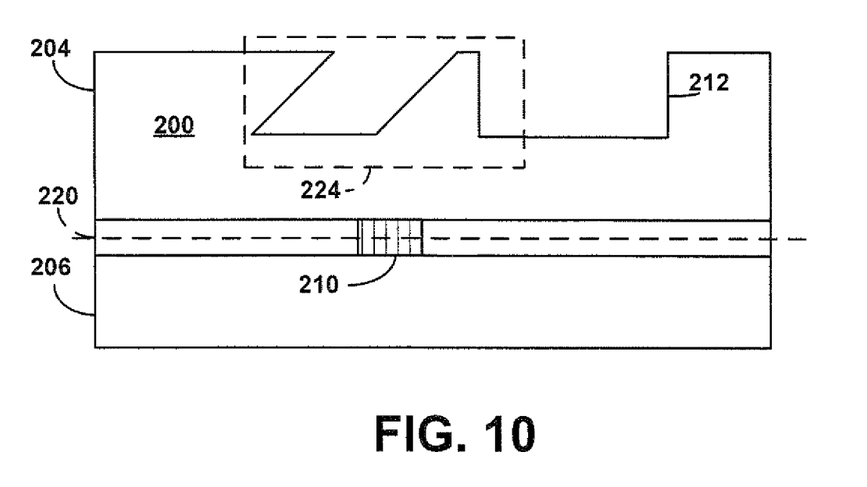
FIG. 10 illustrates an example of a cross sectional view of the optical engine.

FIG. 7 illustrates a top view of another optical engine 200 and an optical transmitter 202 that could be employed, for example, as the optical engine 8 and the optical transmitter 4 illustrated in FIG. 1. FIG. 8 illustrates a cross-sectional view of the optical engine 200 and the optical transmitter 202 taken along line C-C. FIG. 9 illustrates a top view of the optical engine 200 without the optical transmitter 202. FIG. 10 illustrates a cross sectional view of the optical transmitter 202 taken along line D-D. For purposes of simplification of explanation, the same reference numbers are employed in FIGS. 7-10 to reference the same structure.

The optical engine 200 can be implemented as a layered optical engine 200. A first layer 204 of the optical engine 200 can be implemented, for example, as a given material with a given index of refraction, such as an index of refraction of about 1.46. The given material can be an optical medium. In some examples, the given material could be implemented, for example, as silicon dioxide ($SiO_2$). The optical engine 200 can also include a second layer 206 of the given material. Moreover, the optical engine 200 can include an optical waveguide 208 sandwiched between the first and second layers 204 and 206 of the given material. The optical waveguide 208 can be implemented, for example, as an optical waveguide 208 formed of a material with an index of refraction greater than the index of refraction of the given material, such as an index of refraction of about 2.05. In one example, the optical waveguide 208 can be formed from silicon nitride ($Si_3N_4$). The optical waveguide 208 can include a grating coupler 210 that can be implemented, for example, in a manner similar to the grating coupler 12 illustrated in FIG. 1.

The first layer 204 of the optical engine 200 can include an aligning seat 212 to receive the optical transmitter 202. The aligning seat 212 can be formed as a U-shaped trench in the first layer 204 of the optical engine 200. The aligning seat 212 can position the optical transmitter 202 relative to the optical waveguide 208. The optical transmitter 202 can be implemented, for example, as an array of laser diodes, such as an array of K number of vertical-cavity surface-emitting lasers (VCSELs). The optical transmitter 202 can include metal contacts 214 that can be controlled, for example, by external circuitry. The optical transmitter 202 can also include K number of light guides 216 for transmitting optical signals. Each of the K number of light guides 216 by defined by an implant or by an optical gain of the respective light guide 216. Each of the light guides 216 can be embedded in a light generating material. The optical transmitter 202 can also include an n-type substrate 218.

Each of the K number of light guides 216 of the optical transmitter 202 can be independently controlled. Moreover, each of the K number of light guides 216 can transmit an optical signal in a direction substantially parallel to a longitudinal axis 220 of the optical waveguide 208, wherein an optical signal transmitted from the optical transmitter 202 is represented as an arrow 222.

The optical engine 200 can include an optical wedge 224 that can be, for example, etched from the first layer 204 of the optical engine 200. The optical wedge 224 can be employed, for example, to implement the optical signal redirector 22 illustrated in FIG. 1. The optical wedge 224 can be spaced apart from the aligning seat 212. In some examples, the optical wedge 224 can be an air filled trench. The optical wedge 224 can employ total internal reflection (TIR) to tilt the optical signal by a tilt angle, $\delta$ such that the optical signal is tilted toward a grating coupler 210 of the optical waveguide 208.

Figure 11:
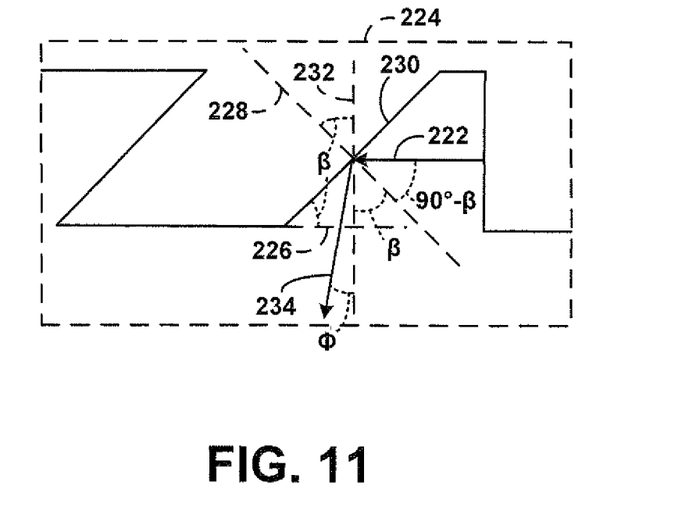
FIG. 11 illustrates an expanded view of another optical wedge.

FIG. 11 illustrates an expanded view of the optical wedge 224 illustrated in FIGS. 8 and 10. For purposes of simplification of explanation, the same reference numbers are employed in FIGS. 7-11 to designate the same structure.

A dashed line 226 is illustrated in FIG. 11 to denote a line parallel to the longitudinal axis 220 of the optical waveguide 208. The arrow 222 denotes an optical signal provided from the optical transmitter 202. A dashed line 228 denotes a line perpendicular to a surface 230 of the optical wedge 224. A dashed line 232 denotes a line perpendicular to the longitudinal axis 220 of the optical transmitter 202. The optical wedge 224 can have an incline angle, denoted as $\beta$. Equations 3-4 can be employed to calculate the incline angle $\beta$.

$$\beta + \phi = 90 - \beta \qquad \text{Equation 3}$$

$$\beta = 45° - \frac{\phi}{2} \qquad \text{Equation 4}$$

wherein:

$\beta$ is the incline angle, defined as the angle between (i) a line 226 parallel to the longitudinal axis 220 of the optical waveguide 208 as well as the optical signal 222 transmitted from the optical transmitter 202 and (ii) a line 228 normal to surface 230 of the optical wedge 224; and $\phi$ is a tilt angle, which can be defined as the angle between the line 232 perpendicular to the longitudinal axis 220 of the optical waveguide 208 and the optical signal tilted by the optical wedge 224, which optical signal is denoted by an arrow 234.

In one example, the tilt angle δ can be an angle from about 2° to about 20° (e.g., about 8°). Accordingly, in such an example, the incline angle β can be about 35° to about 44° relative to the longitudinal axis 220 of the optical waveguide 208. For instance, if the tilt angle δ is about 8°, the incline angle β can be about 41°.

Referring back to FIGS. 7-10, the optical signal can be tilted to a tilt angle by the optical wedge 224 and provided to the grating coupler 210 at the tilt angle (e.g., about 8°) as indicated by the arrow 234. The grating coupler 210 can diffract the optical signal into the optical waveguide 208 such that the optical signal can be propagated through the optical waveguide 208 in the direction indicated by the arrow 236. By employment of the optical engine 200 and the optical transmitter 202, the optical transmitter 202 is automatically seated and aligned in the optical engine 200 upon insertion of the optical transmitter 202 into the optical engine 200. Moreover, the aligning seat 212 and the optical wedge 224 of the optical engine 200 can reduce and/or obviate the need for adjustment of the optical transmitter 202.

Figure 12:
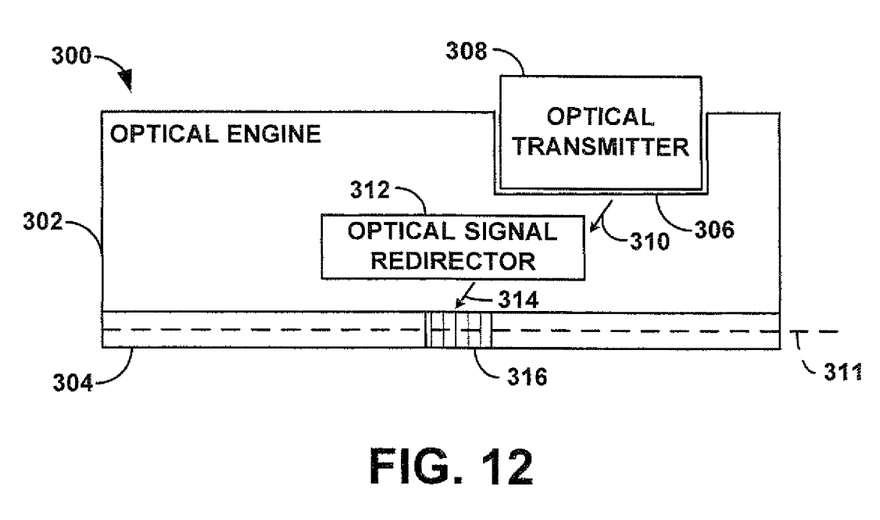
FIG. 12 illustrates yet another example of an optical engine.

FIG. 12 illustrates another example of an optical engine 300. The optical engine can comprise a given layer 302 of given material overlaying an optical waveguide 304 of another material. The given layer 302 of given material can comprise an aligning seat 306 to receive an optical transmitter 308 to provide the optical signal 310 and to align the optical transmitter 308 such that the optical transmitter 308 provides the optical signal 310 in a direction that is substantially non-oblique (e.g., parallel or perpendicular) relative to a longitudinal axis 311 of the optical waveguide. The given layer 302 can also comprise an optical signal redirector 312 to tilt the optical signal 310 by a tilt angle to provide a tilted optical signal 314. The optical waveguide 304 can comprise a grating coupler 316 to diffract the tilted optical signal 314 into the optical waveguide 304.

Figure 13:
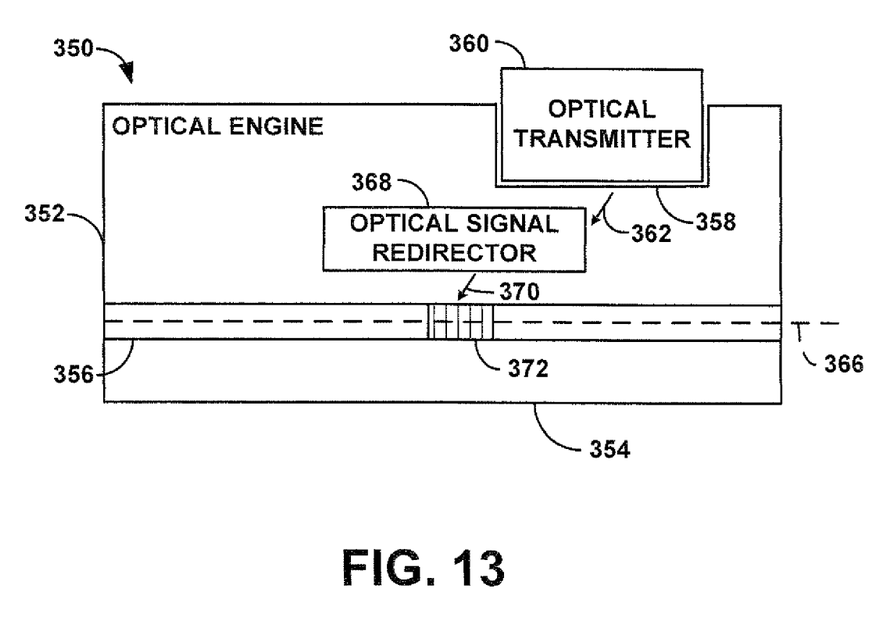
FIG. 13 illustrates still yet another example of an optical engine.

FIG. 13 illustrates yet another example of an optical engine 350. The optical engine 350 can comprise a given layer 352 of a given material and another layer 354 of the given material. The optical engine can also include an optical waveguide 356 sandwiched between the given and the another layers 352 and 354. The given layer 352 can comprise an aligning seat 358 to align an optical transmitter 360, such that the optical transmitter 360 provides an optical signal 362 that is substantially perpendicular or substantially parallel to a longitudinal axis 366 of the optical waveguide 356. The given layer 352 can also comprise an optical signal redirector 368 to redirect the optical signal at a tilt angle, such that the optical signal 370 intersects with a grating coupler 372 of the optical waveguide 356.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims.

What is claimed is:

1. An optical engine comprising:
   a given layer of given material overlaying an optical waveguide of another material, the given layer of given material comprising:
   an aligning seat including;
   a first side surface;
   a second side surface opposite the first side surface; and
   a bottom surface extending from the second side surface,
   wherein the aligning seat is to:
   receive an optical transmitter to provide an optical signal; and
   align the optical transmitter such that the optical transmitter provides the optical signal in a direction that is substantially non-oblique relative to a longitudinal axis of the optical waveguide; and
   an optical signal redirector including a surface extending from the first side surface such that a gap is formed between a bottommost surface of the optical transmitter and the given layer of given material,
   wherein the optical signal redirector is to tilt the optical signal by a tilt angle;
   the optical waveguide comprising:
   a grating coupler to diffract the optical signal provided at the tilt angle into the optical waveguide.

2. The optical engine of claim 1, wherein the given material comprises silicon dioxide.

3. The apparatus of claim 2, wherein the another material comprises silicon nitride.

4. The optical engine of claim 1, wherein the tilt angle is about 2° to about 20° relative to a line perpendicular to the longitudinal axis of the optical waveguide.

5. The optical engine of claim 1, wherein the aligning seat is to align the optical transmitter such that the optical transmitter provides the optical signal in a direction substantially perpendicular to the longitudinal axis of the optical waveguide.

6. The optical engine of claim 5, wherein the gap comprises an air filled trench.

7. The optical engine of claim 6, wherein the surface of the optical redirector has an incline angle that tilts the optical signal to the tilt angle.

8. The optical engine of claim 7, wherein:

$$\theta < 90° - \sin^{-1}\left(\frac{n_1}{n_2}\right);$$

wherein:
θ is the tilt angle;
$n_1$ is the index of refraction of air, and
$n_2$ is the index of refraction of the given material.

9. An optical engine comprising:
a given layer of a given material;
another layer of the given material; and
an optical waveguide sandwiched between the given and the another layers;
the given layer comprising:
an aligning seat to align an optical transmitter, such that the optical transmitter provides an optical signal that is substantially perpendicular to a longitudinal axis of the optical waveguide; and
an optical signal redirector disposed between the aligning seat and the optical waveguide and having a surface that extends from the aligning seat to redirect the optical signal at a tilt angle, such that the optical signal intersects with a grating coupler of the optical waveguide.

10. The optical engine of claim 9, wherein the tilt angle is between about 2° and about 20° relative to a line perpendicular to the longitudinal axis of the optical waveguide.

11. The optical engine of claim 9 comprising an air filled gap between a bottommost surface of the optical transmitter and the surface of the optical signal redirector.

12. The optical engine of claim 9, wherein the surface of the optical signal redirector extends from a side surface of the aligning seat.

13. The optical engine of claim 12, wherein the grating coupler has a side surface that is substantially coplanar with the side surface of the aligning seat.

14. A system comprising:
  an optical transmitter to provide a plurality of independently controllable optical signals in a given direction; and
  an optical engine comprising:
    a given layer of silicon dioxide;
    another layer of silicon dioxide; and
    an optical waveguide formed of silicon nitride sandwiched between the given and the another layers of silicon dioxide, the optical waveguide comprising:
      a grating coupler to diffract the independently controllable optical signals into the optical waveguide;
    the given layer of silicon dioxide comprising:
      an aligning seat to align an optical transmitter, such that the optical transmitter provides the independently controllable optical signals at a substantially non-oblique angle relative to a longitudinal axis of the optical waveguide; and
      an optical signal redirector disposed between the aligning seat and the optical waveguide and having a surface that extends from the aligning seat comprising an air filled trench to redirect the optical signal at a tilt angle, such that each of the independently controllable optical signals intersects with the grating coupler of the optical waveguide at the tilt angle.

15. The system of claim 14, wherein the air filled trench extends to a bottommost surface of the optical transmitter aligned by the aligning seat.

\* \* \* \* \*